UNITED STATES PATENT OFFICE.

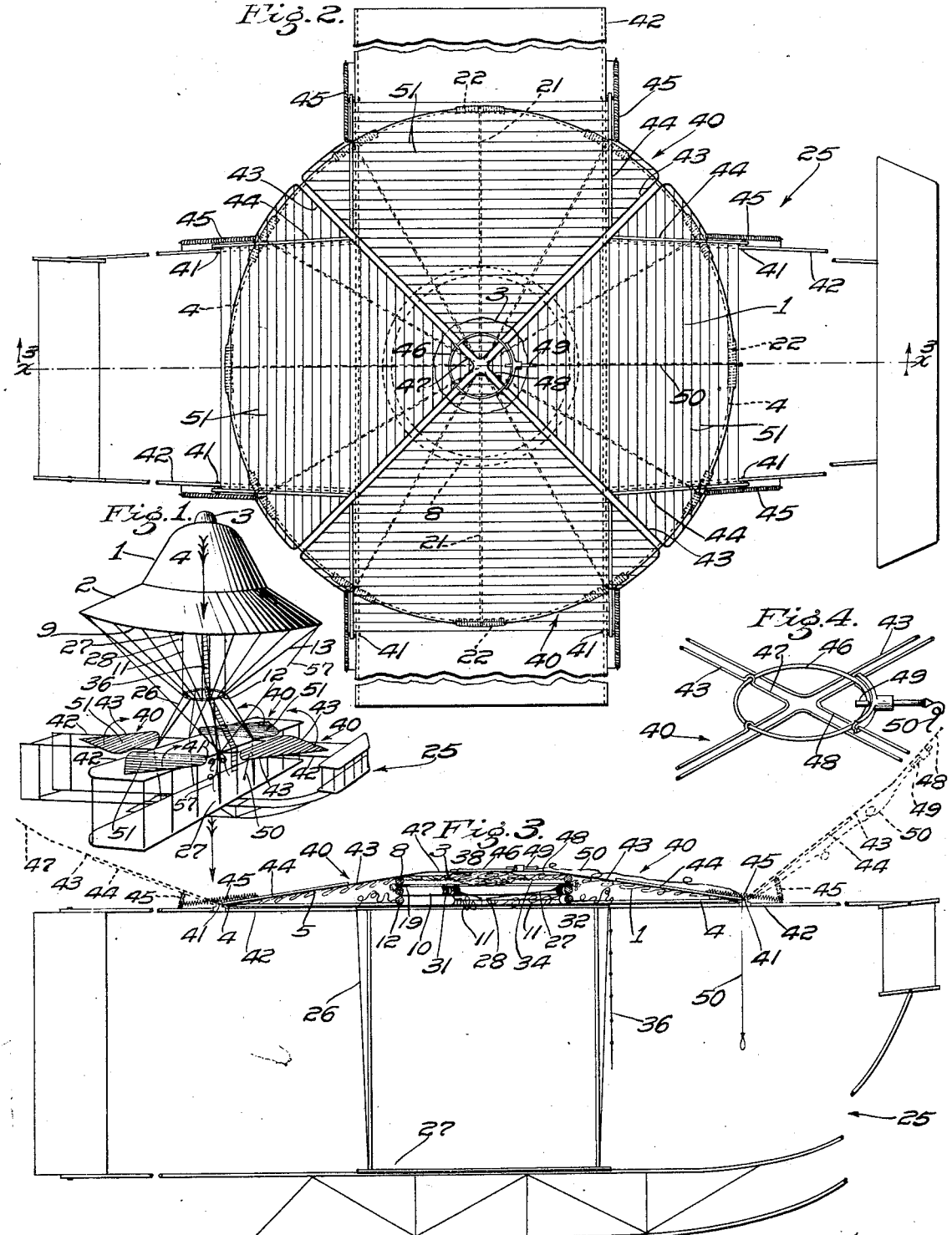

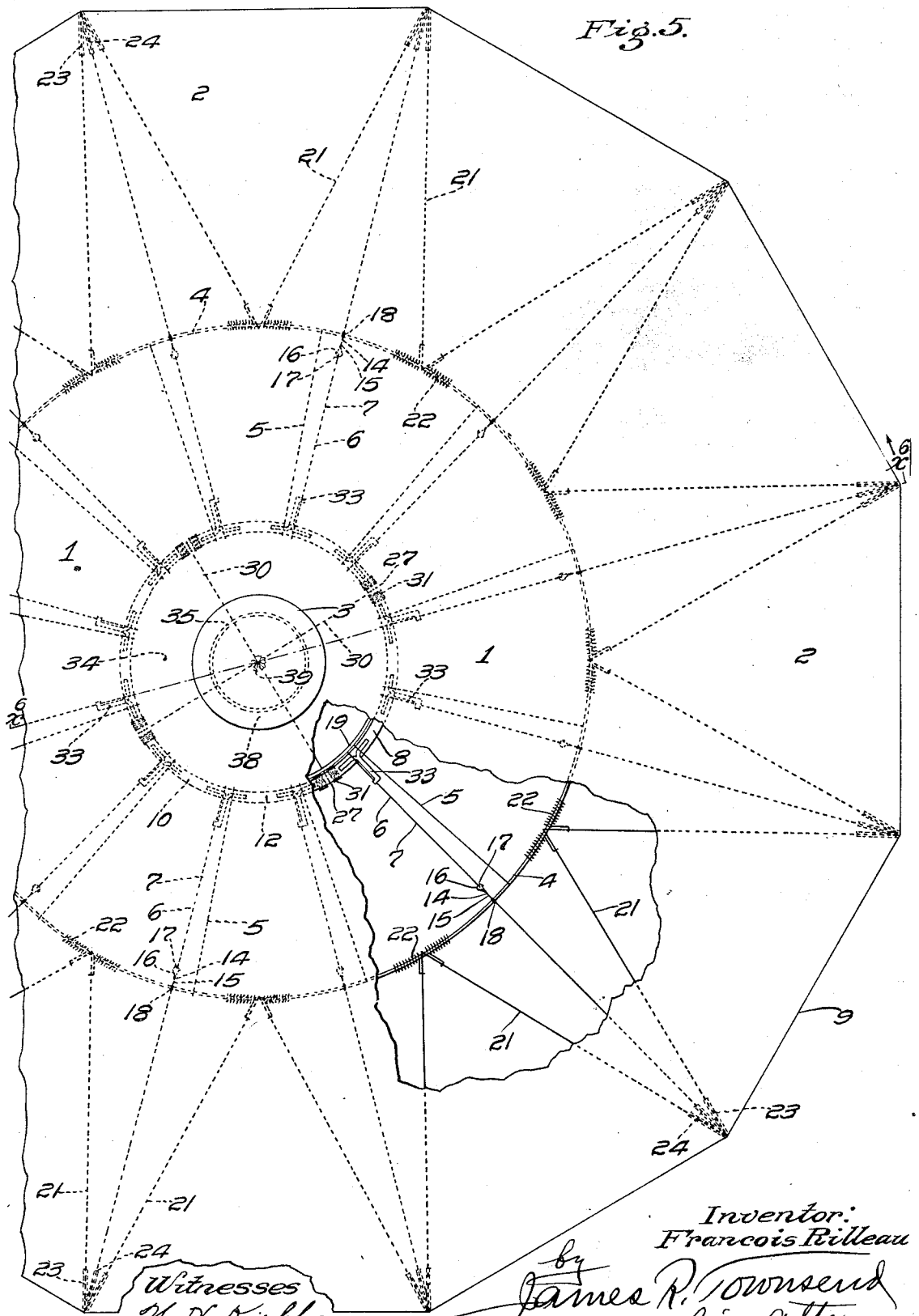

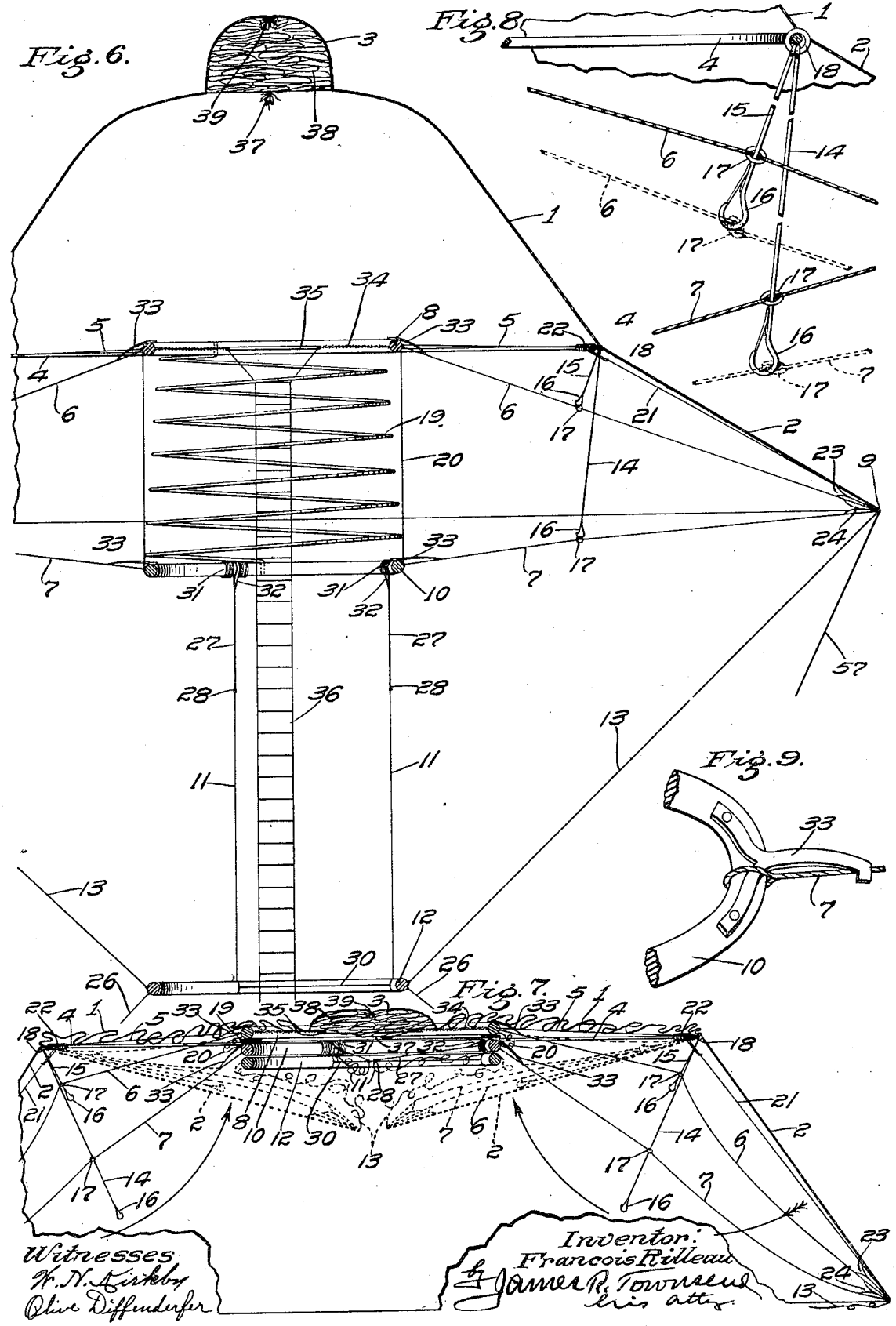

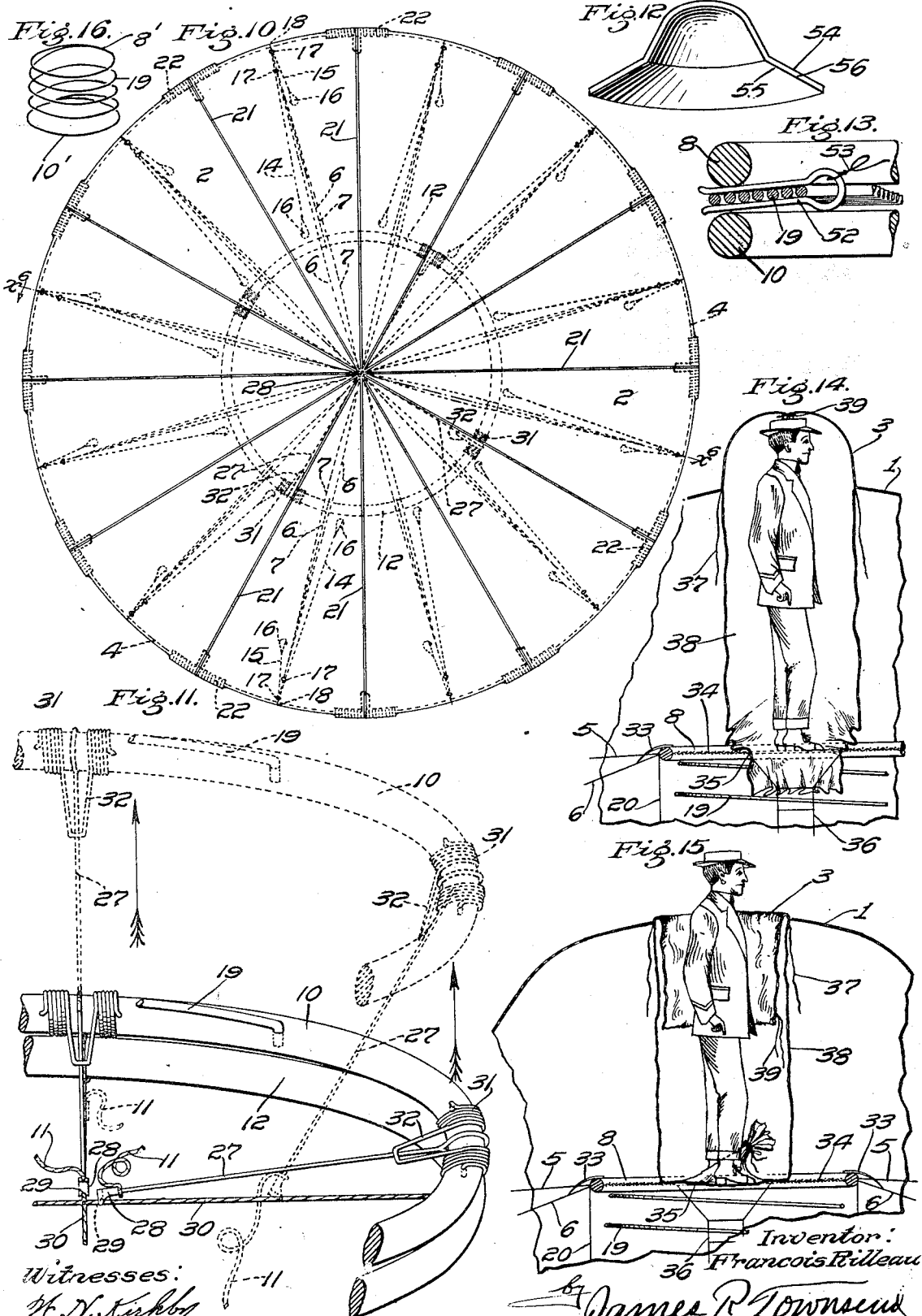

FRANCOIS RILLEAU, OF LOS ANGELES, CALIFORNIA.

AIRSHIP LIFE-SAVER.

1,046,023.  Specification of Letters Patent.  Patented Dec. 3, 1912.

Application filed September 13, 1910. Serial No. 581,875.

*To all whom it may concern:*

Be it known that I, FRANCOIS RILLEAU, a citizen of France, residing at Los Angeles, in the county of Los Angeles and State of California, have invented a new and useful Airship Life-Saver, of which the following is a specification.

The object of this invention is to provide means whereby an aeroplane or other form of airship may be provided with means which will not materially impede the flight of the airship and which will become effective in case of accident, to check and ease the descent so that the airship and its occupants may alight without injury.

A further object is to so construct the apparatus that in case the airship alights in the water the apparatus will float and the passengers therein may maintain themselves afloat and be enabled to take observations, and may escape from the floating apparatus.

The invention includes the apparatus and the parts and combinations of parts more particularly described in the subjoined detailed description, from which other objects and advantages may appear.

The apparatus will be built of the lightest and at the same time strongest material obtainable.

The accompanying drawings illustrate the invention.

Figure 1 is a reduced perspective view of a safety device embodying this invention in use to ease the descent of an aeroplane to which it is applied. Fig. 2 is a plan showing the safety device collapsed, folded and fastened upon the top of an aeroplane ready for use. Fig. 3 is a sectional elevation on line $x^3$, Fig. 2. Dotted lines represent the retainers as being swung out to release the parachute. Fig. 4 is a detail illustrating the fastening means or latch for the retainers. Fig. 5 is a fragmental top view of the parachute open. A portion of the cover is broken to expose details of the parachute frame. Fig. 6 is a section on plane indicated by $x^6$, Figs. 5 and 10 showing the parachute open to ease the descent of the aeroplane which is omitted to contract the view. To avoid confusion most of the parts beyond the plane of section are not shown. Some of such parts are shown. Fig. 7 is a section on the same plane as Fig. 6 showing the parachute collapsed and partly folded. Dotted lines indicate a position of the rim just before the folding is completed. Fig. 8 is an enlarged fragmental detail to illustrate the stay rods shown in Figs. 6 and 7. Fig. 9 is an enlarged fragmental detail of one of the bracing springs which tend to hold the braces in position when the parachute is open. Fig. 10 is a view of the underside of the parachute collapsed and folded. Fig. 11 is an enlarged fragmental detail of means to assist in opening the parachute, upon its release. Fig. 12 is a reduced midsection of a form of parachute having a double walled cover forming a chamber to retain a gas such as hydrogen. Fig. 13 is an enlarged detail to illustrate means for holding down the main spring during the operation of folding the parachute. Fig. 14 is a fragmental section on the same plane as Fig. 6 with the tubular bulk-head or air-sack released to allow the operator to open the lookout. Fig. 15 is a view analogous to Fig. 13 showing the operator incased in the bulk-head and the outlook opened. Fig. 16 is a detail showing another form of constructing the central rings.

The use illustrated in Figs. 14 and 15 will occur when the parachute alights in water.

The cover comprises a crown 1 and a rim 2 which are made of suitable material that is practically impervious to air and is light and strong. This may be made of fine closely woven linen appropriately treated to prevent air from passing therethrough. Said cover is collapsible and foldable and the top of the crown may or may not be provided with a lookout hood 3 which may be hermetically closed and may be opened when a person inside the crown desires to look out. At the junction of the dome-like crown 1 and rim 2 the crown ring 4 is fastened to the underside of the cover and constitutes a part of the parachute frame which is provided with upper, intermediate and lower radial braces 5, 6 and 7, respectively, to connect the cover with the top, and intermediate central rings. The upper braces 5 extend from the crown ring 4 to the top central ring 8 from which the intermediate braces 6 extend radially to the rim cord 9 at the margin of the rim 2. The braces 7 connect the rim cord 9 with the intermediate inner ring 10 to which are connected lower drop lines 11 to support the bottom central ring 12 that is held in central position by the lower braces 13.

Stays 14 and 15 that are preferably rods provided at their lower ends with snap hooks 16 are connected with the braces 6 and 7 by eyes 17 carried by said braces. Said stays are pivotally connected with the crown ring 4 by links 18. The eyes 17 are of sufficient diameter to run freely along the bodies of the stays 14 and 15, and the snap hooks are of such size that when the eyes are drawn thereonto they will be caught thereby.

Between the upper and intermediate central rings 8 and 10 a conical coil main spring 19 is provided; the same being fastened at its upper end to the top ring 8 and at its lower end to the intermediate ring 10. The tendency of such spring is to hold the rings apart. When compressed the spring will lie flat one coil within another. For compactness the top and intermediate rings may be continuations of the spring 19 as indicated at 8' and 10', Fig. 16. The upper drop lines 20 connect the central rings 8 and 10 and restrain the large central spring from too great expansion.

The crown 1 and lookout 3 are flexible so as to naturally subside into the folded position shown in Figs. 3 and 7, and when the apparatus is to be applied to an aeroplane or other form of airship, the rim 2 may be folded underneath as indicated by the bottom view shown in Fig. 10, thus bringing the parachute into compact form. To facilitate such folding and also to strengthen and stiffen the cover, radial ribs 21 are hinged to the crown ring 4 and are adapted to be extended into the position indicated in Figs. 5 and 6 by means of spreading springs 22 fastened to the crown ring 4. Marginal spreading springs 23 and 24 may also be provided at the outer margin of the rim 2 between the braces 6 and 7 and between the braces 6 and the ribs 21. The bending of the springs 19, 22, 23 and 24 is to hold the rim and the upper and intermediate rings in the relative positions shown in Fig. 6. The apparatus may be folded by overcoming the tendency of said springs and doubling the rim 2 and its ribs 21 underneath the crown 1.

To fold the apparatus the spring 19 will first be compressed to bring the rings 8 and 10 close together as shown in Fig. 7 and then the ribs 21 may be bent underneath. Preferably the lower ring 12 will also be brought against the intermediate ring 10 and the cover folded against the underside of such ring. The stays 14 and 15 are normally unhooked to allow the rim to fold inwardly.

The airship 25 is connected with the lower ring 12 by supporting lines 26 which diverge from said lower ring and are connected by any suitable means with the lower portion 27 of the airship frame.

The intermediate central ring 10 is provided with a plurality of legs 27, preferably four as shown in the drawings, that connect the drop lines 11 with said ring and have feet 28 with grooves 29 to engage and run along radial guides 30 which are secured to the bottom ring 12. Springs 31 fastened to the rings 10 and having arms 32 bearing upon the legs, tend to swing the legs down and out toward a vertical position. The drop lines 11 are secured to the feet 28 of the legs 27.

The solid lines in Fig. 11 show the rings 8 and 10 together and the feet 28 engaging the guides 30 as will be the case when the parachute is folded as shown in Figs. 3 and 7 and secured to the top of the air-ship 25. When the parachute is free to be opened, the legs 27 will be forced by the springs 31 down and out along the guides 30; thereby forcing the rings 10 and 12 apart as shown in dotted lines in Fig. 11. The initial thrust of the ring 10 is provided to allow sufficient space for the rim 2 to unfold.

The springs employed in each instance must be of sufficient strength to instantaneously or quickly expand the rim thus to put the parachute into commission before the aeroplane has had time to fall any great distance or attain a high descending speed.

Tension springs 33 fixed to the upper and intermediate rings 8 and 10 press downward upon the braces 6 and 7 to hold them taut when the rim is unfolded and the braces 6 and 7 are caught in the hooks of the stays 14 and 15. A netted floor 34 having a hatch-way 35 is provided within the top ring 8 and supported thereby to sustain passengers inside the crown 1 when the parachute is in action; and a ladder 36, which may be of cords, leads from the air-ship through the rings 12 and 10 to the hatch-way 35 and is long enough to enable the passenger of the airship to ascend into the parachute in case he so desires, and there is sufficient time, while the apparatus is descending. By so ascending the passenger may get within the crown and thus be supported after the apparatus alights in case the apparatus falls into the sea or other deep body of water.

The floor 34 is close enough to the top of the crown to allow a person standing on the floor to loosen the fastening 37 and release the bulk head sack 38 and allow such sack to extend down to the floor. The passenger may allow the sack to drop down over him thus giving him ready access to the fastening which may be a draw-string 39 that holds together and hermetically closes the otherwise open top of the look-out 3. In Fig. 14 the passenger is shown standing on a portion of the bulk head sack 38 which is supported by the netted floor 34; and in Fig. 15 the look-out is open and the sack is shown tied under the passenger's feet. The purpose of the bulk head sack is to retain the air in the crown 1 while the look-out is open.

In order to hold the cover from being carried off by the rush of air during the operation of flying, retaining means in the form of segmental frames 40, four in number, are hinged by hinges 41 to the aeroplane frame 42 at front and back and at the sides of the cover and are adapted to fold on top of the cover above the aeroplane as shown in Figs. 2 and 3. Said segmental frames are each provided with wire edge-members 43 that are connected to bars 44 that conform in position to the rim of the cross-like top frame 42 of the aeroplane. The edge members 43 of each segmental retaining frame converge toward the center of the cover when the cover is collapsed. Springs 45 fastened to the segmental frames and to the aeroplane frame serve to throw the segmental frames upward and outward. Said segmental frames are held in their closed position as shown in Fig. 2 by suitable means, as the ring 46 fastened to the tip 47 of one of the segmental frames and folded down over the tops of the other frames and secured to the tip 48 of the frame diametrically opposite the tip 47 by means of a spring latch 49 controlled by a line 50 within reach of the aviator. The segmental frames are provided with cross wires or cords 51 that lie on top of the cover and hold it down in place.

Suitable means may be provided to hold the main expansion spring 19 compressed during the operation of folding the rim. Such means are suggested in Fig. 13 where a clamp 52 embraces all of the members of said spring 19. After the rim has been folded as shown in Fig. 10 the clamps may be drawn off of the spring 9 by cords 53 led through the central opening within the folded rim.

The cover may be provided with outer and inner walls 54, 55, spaced apart to afford a gas chamber 56 between them as shown in Fig. 12, the purpose being to allow hydrogen gas to be introduced into the cover to lend buoyancy thereto.

Ropes 57 attached to the rim at the front, the rear and the right and left sides of the rim of the cover are within the control of the aviator and by drawing in one or more of such ropes while the apparatus is descending, the aviator may guide the descent, so as to escape buildings, precipices and any other obstacles which otherwise may damage the apparatus or cause it to careen or upset in its descent. In case of accident during a flight, the latch will be loosened by the aviator and thereupon the springs act to throw the parachute upward relative to the air ship, and the descent is thus made safe.

I claim:—

1. A safety device for air ships comprising a collapsible parachute cover, spring means for opening said cover, means to fasten said cover to the air ship comprising frames fastened to the air ship and folding over the cover and latch means for locking the frame together above the cover.

2. A safety device for air ships comprising a cover having a collapsible dome-like crown, a foldable rim and means to open the rim.

3. A safety device for air ships comprising frames hinged to the air ships and adapted to fold toward each other, springs to open said frames, a parachute, and means to temporarily hold said frames folded over the parachute.

4. A safety device for an air ship comprising frames hinged to the air ship and adapted to fold toward each other, springs to open said frames, a parachute latch means to hold said frames folded over the parachute and means under the control of the aviator to release the latch.

5. The combination with an air ship of a parachute on the air ship, segmental frames fastened to the air ship and adapted to fold over the parachute, latch means to hold the frame folded over the parachute, means adapted to release the latch and springs to throw open the frames to release the parachute.

6. A safety device for an air ship comprising frames hinged to the air ship and adapted to fold toward each other, springs to open said frames, a parachute, latch means to hold said frames folded over the parachute and means under the control of the aviator to release the latch; said parachute being provided with springs to open the same when the frame is released.

7. A safety device for an air ship comprising a collapsible crown, a foldable rim around the crown, three superposed rings beneath the crown, means connecting the top ring with the edge of the crown, means connecting the intermediate ring with the edge of the rim, means connecting the lower ring with the rim and with the intermediate ring, means connecting the intermediate ring with the top ring and springs to force the top ring and the intermediate ring apart.

8. A safety device for an air ship, comprising two rings, a spring to force said rings apart, means connecting the rings to stay the spring, a cover comprising a crown over the rings, a rim connected with the crown and foldable thereunder, braces between the upper ring and the ring of the crown, braces between the lower ring and the edge of the rim and springs to extend the braces to expand the rim.

9. A safety device for airships comprising a cover having a crown and a rim, a ring at the junction of the crown and the rim, rings centrally arranged beneath the cover, a spring to force the centrally arranged rings apart, means connecting the centrally arranged rings to stay the spring, braces between the upper ring and the ring of the cover, braces between the lower ring and cover and the edge of the rim, braces between the upper ring and the edge of the rim, and stays fastened to the ring of the cover and adapted to support the braces.

10. In a safety device for air ships three superposed rings, flexible connections connecting said rings to each other, a cover over said rings, means connecting the rings with the cover, means for connecting the lower ring with the air ship, and means for temporarily holding the cover on the air ship.

11. A safety device for an air ship comprising a cover having a crown and a rim and a ring at the junction of the crown and rim, three centrally arranged rings beneath the cover, flexible connection connecting said rings together, spring means for forcing the upper two of said rings apart, said rim being adapted to fold to inclose the centrally arranged rings inside the cover.

12. A safety device for an airship comprising a parachute, means to connect the parachute with the airship there being a floor supported inside the parachute, a crown above said floor and a ladder by which access from the airship to the interior of the parachute may be attained.

13. The combination with an airship of a cover comprising a crown and a rim, of a floor supported by the crown and provided with an opening therethrough, and a ladder connected with said floor and adapted to give access from the airship to the interior of the crown.

14. A safety device for an airship comprising a parachute having an air space therein and a hermetically sealed lookout at the top of the parachute.

15. A safety device for an airship comprising a parachute having an air space in its upper portion and a hermetically sealed lookout at the top and also a bulkhead sack to contain a person desiring to use the lookout.

16. A safety device for an airship comprising a parachute having an air space in its upper portion and a hermetically sealed lookout at the top and also a bulkhead sack to contain a person desiring to use the lookout, and means to hermetically close the sack at the bottom.

17. In a safety device for an airship a cover provided with a crown, a rim and a ring between the crown, a centrally arranged ring connected with the ring of the cover, a ring below said centrally arranged ring, resilient means to hold the centrally arranged rings apart, stays to extend from the centrally arranged rings to the edge of the rim, said stays being provided with eyes and braces, of braces connected with the ring and the cover and running through the eyes of the braces and provided with snap-hooks to engage said eyes when the cover is expanded.

18. In a safety device for an airship a cover provided with a crown, a rim and a ring between the crown and rim, a centrally arranged ring connected with the ring of the cover, a ring below said centrally arranged ring, resilient means to hold the centrally arranged rings apart, braces to extend from the centrally arranged rings to the edge of the rim, said braces being provided with eyes, and stay rods connected with the ring and the cover and running through the eyes of the braces and provided with snap-hooks to engage said eyes when the cover is expanded, and springs to act upon the braces to expand the cover.

In testimony whereof, I have hereunto set my hand at Los Angeles, California this 6th day of September, 1910.

FRANCOIS RILLEAU.

In presence of—
  JAMES R. TOWNSEND,
  OLIVE DIFFENDERFER.